United States Patent [19]

Volent

[11] 3,949,037

[45] Apr. 6, 1976

[54] METHOD OF MAKING A SIMULATED BRICK HAVING A CONFIGURED UNDERCUT FACE AND A REVERSE SURFACE HAVING A SHARP UPSTANDING PERIPHERAL EDGE

[75] Inventor: Stanley C. Volent, West Boylston, Mass.

[73] Assignee: Dacor, Incorporated, Worcester, Mass.

[22] Filed: July 1, 1974

[21] Appl. No.: 484,667

Related U.S. Application Data

[60] Continuation-in-part of Ser. No. 288,681, Sept. 14, 1972, abandoned, which is a continuation of Ser. No. 83,947, Oct. 26, 1970, abandoned, which is a division of Ser. No. 816,162, April 6, 1969, Pat. No. 3,555,757, which is a continuation of Ser. No. 663,648, Aug. 28, 1967, abandoned.

[52] U.S. Cl. ................ 264/129; 264/163; 264/219; 264/267

[51] Int. Cl.$^{2}$ ............................................ B29D 9/08

[58] Field of Search ........... 264/219, 220, 225, 163, 264/162, 334, 313, 318, 129, 250, 267; 425/DIG. 44

[56] References Cited

UNITED STATES PATENTS

| | | | |
|---|---|---|---|
| 3,061,500 | 10/1962 | Krier | 264/313 |
| 3,306,956 | 2/1967 | Barnette | 264/313 |
| 3,353,220 | 11/1967 | Lenoble | 264/313 |
| 3,392,052 | 7/1968 | Davis | 264/163 |

*Primary Examiner*—Robert F. White
*Assistant Examiner*—Willard E. Hoag
*Attorney, Agent, or Firm*—Norman S. Blodgett; Gerry A. Blodgett

[57] ABSTRACT

This invention has to do with a simulated brick formed of plastic, a method for making the brick, and a wall structure incorporating the brick and simulated mortar polyester plastic is cast in a polyvinyl chloride mold and a doctor blade or knife is passed over the mold depressing the mold edges and removing excess material so that the mold when released will spring back and a meniscus is formed by the plastic against the surrounding mold wall.

1 Claim, 11 Drawing Figures

FIG. 1
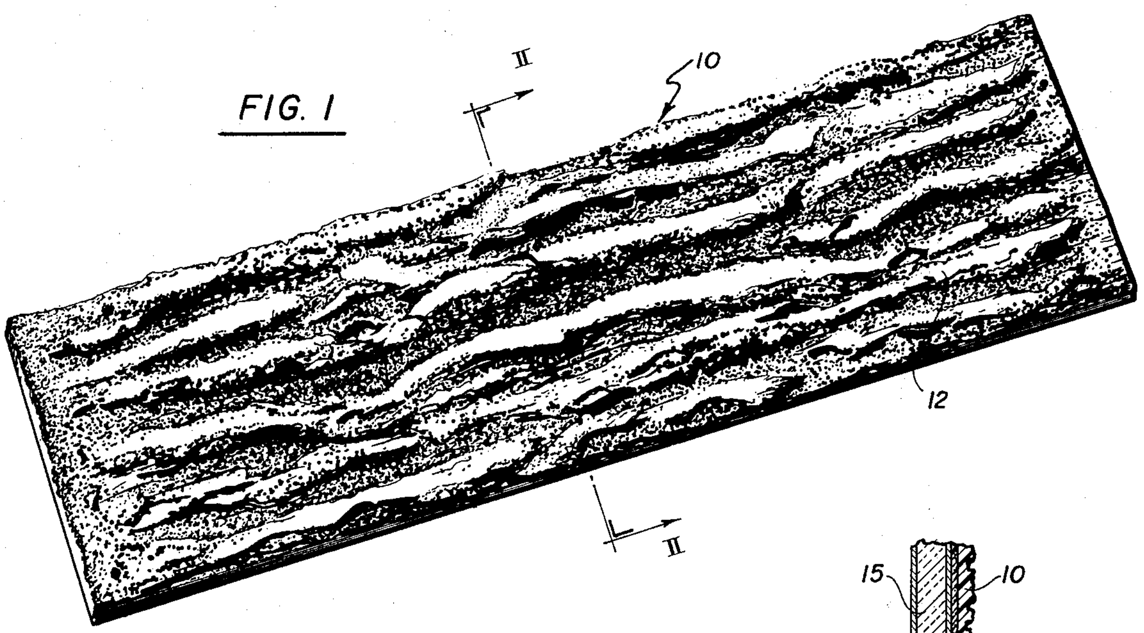
FIG. 2
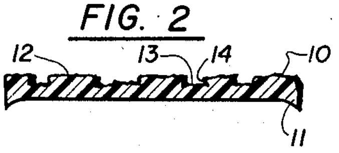
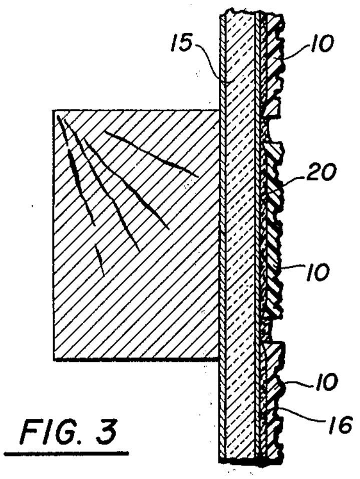
FIG. 3
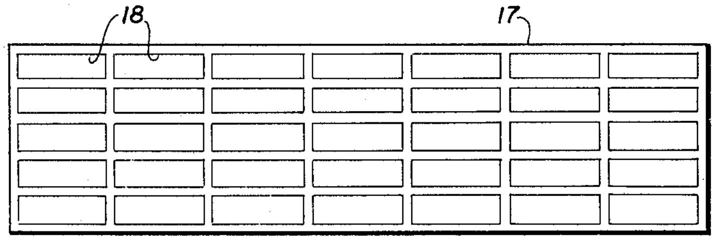
FIG. 4
STANLEY C. VOLENT
INVENTOR.
BY FIG. 5
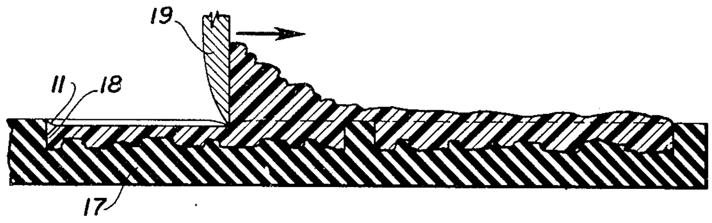
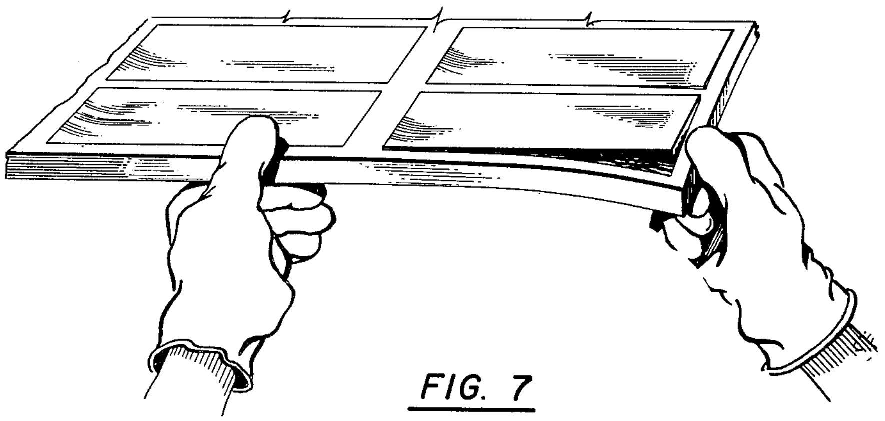
FIG. 7
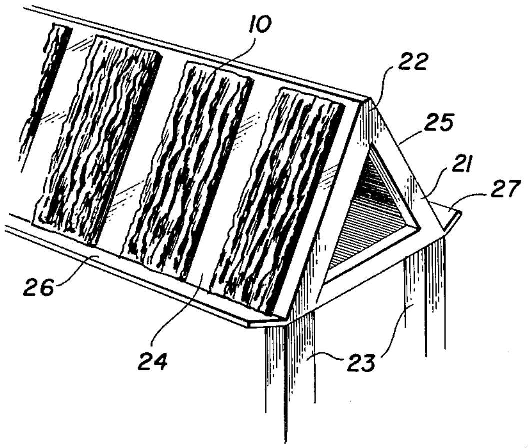
FIG. 8
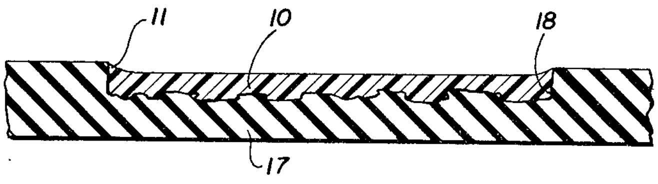
FIG. 6

METHOD OF MAKING A SIMULATED BRICK HAVING A CONFIGURED UNDERCUT FACE AND A REVERSE SURFACE HAVING A SHARP UPSTANDING PERIPHERAL EDGE

REFERENCE TO COPENDING APPLICATIONS

This application is a continuation-in-part of my application Ser. No. 288,681 filed Sept. 14, 1972, now abandoned, which is a continuation of my application Ser. No. 83,947 filed Oct. 26, 1970 now abandoned, which is a division of my application Ser. No. 816,162 filed Apr. 6, 1969 now U.S. Pat. No. 3,555,757, which, in turn, is a continuation of my application Ser. No. 663,648 filed Aug. 28, 1967 now abandoned.

BACKGROUND OF THE INVENTION

It has been common practice in the building arts to use artificial brick formed of plastic. However, in most cases, the resulting brick has had an artificial appearance and does not really look like real brick. Furthermore, extreme difficulty has been experienced in placing these bricks so that they are properly arranged on a wall. Also, they have suffered from the disability that they come off of the wall easily. These and other difficulties experienced with the prior art devices have been obviated in a novel manner by the present invention.

It is, therefore, an outstanding object of the invention to provide a simulated brick which has all the appearance of a real brick.

Another object of this invention is the provision of a method of forming simulated brick by which excellent appearing brick can be made by inexperienced labor.

A further object of the present invention is the provision of a wall covered mastic and using a simulated brick, wherein the exact appearance of real brick and mortar is obtained.

It is another object of the instant invention to provide a simulated brick which is inexpensive to manufacture, which is capable of a long life even in unfavorable conditions, and which can be washed and kept clean by usual cleaning methods.

With these and other objects in view, as will be apparent to those skilled in the art, the invention resides in the combination of parts set forth in the specification and covered by the claims appended hereto.

SUMMARY OF THE INVENTION

In general, the present invention has to do with a simulated brick having a plastic body of generally thin, plate-like conformation, one side of the body being formed to resemble the rough surface of a brick and the other side being formed with a peripheral flange having a sharp edge. The invention also has to do with a method of forming such a brick making use of an open-cavity mold formed of a rubber-like material, each cavity being filled with plastic in a liquid condition and passing a rigid sharp blade over the mold to compress it and carry away sufficient plastic so that less plastic than the normal capacity of each cavity remains behind; this permits the mold to return to its normal condition so that the level of the plastic in each cavity is below the upper edge of the cavity, but the plastic around the edges of each cavity is drawn up by capillary action to the upper edge to form a sharp-edged flange. The simulated brick formed in this way is applied to a wall by use of a mastic resembling a sand-bearing motor, which mastic is also formed of a suitable plastic material.

BRIEF DESCRIPTION OF THE DRAWINGS

The character of the invention, however, may be best understood by reference to one of its structural forms, as illustrated by the accompanying drawings, in which:

FIG. 1 is a perspective view of a simulated brick embodying the principles of the present invention, FIG. 2 is a sectional view of the brick taken on the line II—II of FIG. 1, FIG. 3 is a sectional view of a wall making use of the brick and showing it in use with a mastic, FIG. 4 is a plan view of a mold used in forming the brick, FIG. 5 is a sectional view of the mold showing the plastic being applied, FIG. 6 is a view of the mold after the plastic has been inserted in the mold cavity and a blade has been passed over it, FIG. 7 shows the method of removing the brick from the mold, FIG. 8 shows the manner in which the brick is cured and processed.

DESCRIPTION OF THE PREFERRED EMBODIMENT

Figure 9:
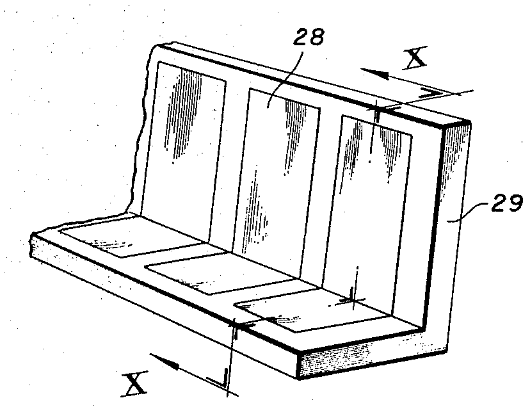
FIG. 9 shows a mold useful in forming a corner brick.

Referring first to FIG. 1, which best shows the general features of the invention, a simulated brick, indicated generally by the reference numeral 10, is shown as comprising a plastic body of generally thin, plate-like conformation. One surface 12 of the body is formed to resemble the rough surface of a brick and the other side, as is best evident in FIG. 2, is formed with a peripheral flange 11 having a sharp edge. As can be readily seen in FIGS. 1 and 2, the surface 12 which faces outwardly is provided, as a rough brick is, with re-entrant angles or undercuts; that is to say, the grooves are such that, if the material were formed in the usual manner, it would not be possible to "draw" out of the mold. For instance, in FIG. 2, a groove 13 is provided with a side 14 that lies at an acute angle to the bottom, which means that, in normal casting practice, the groove would not draw. The brick is formed of a polyester plastic using a catalyst of ethyl methyl ketone and a filler of powdered limestone.

Referring to FIG. 3, the manner in which the brick is used is clearly shown. A wall 15 of interior dry wall construction has an outer vertical surface 16 which it is desired to ornament with simulated brick. The wall is covered with a thin layer of a mastic 20 and a layer of mastic is applied to the back surface of each brick and leveled off by drawing a putty knife across the edges of the peripheral flange 11. The bricks are then pressed into place until the edges of the flanges 11 strike the surface 16. This flange assures that the outer surfaces of the brick are perfectly flat and in the same plane with one another. The mastic extrudes from behind each brick into the space between the bricks in the manner of mortar in a real brick wall. The mastic is formed of a copolymer plastic mixed with a limestone filler and sand and is colored to be slightly off-white to best resemble mortar.

Referring to FIG. 4, it can be seen that the mold 17 is a large rectangular body having a plurality of mold cavities 18. The mold is formed of polyvinyl chloride which is an elastomer having soft, rubber-like qualities.

The method of forming the bricks is shown in FIGS. 5, 6, 7, and 8. Referring to FIG. 5, the cavity 18 of the mold 17 is filled with the plastic and a rigid sharp blade 19 is scraped over the mold. As is evident in the drawing, the sharp edge of the blade compresses the mold substantially so that, after the blade has gone by and the mold returns to its former position, the cavity 18 is less than filled with the plastic. However, because of capillary effect, the flange 11 remains behind. When the blade has been completely passed over the mold, the cavity and the plastic therein have the appearance shown in FIG. 6. The upper side of the brick (which forms the back) is depressed except for the outer periphery which is raised to form the flange 11.

After the brick has had a chance to cure for a short time, the operator is able to bend the mold in the manner shown in FIG. 7, so that a corner of a brick protrudes from the mold. He can then grasp this corner and remove the brick. Another way of removing the bricks is to lay the mold face down on a flat surface and to peel the mold with a bending motion away from the bricks. The operator then places each brick on a rack 21 for final curing and treatment. The stand has an upper portion 22 supported on legs 23. The upper portion has two inclined surfaces 24 and 25 at the bottom of which are formed flanges 26 and 27, respectively. The bricks are thus supported to take up as little room as possible and yet be fully supported so that they will not deform until curing is completely accomplished. At the same time, they are in a good position to be worked on for coloring, burning and like treatments, which will be described hereinafter.

Figure 10:
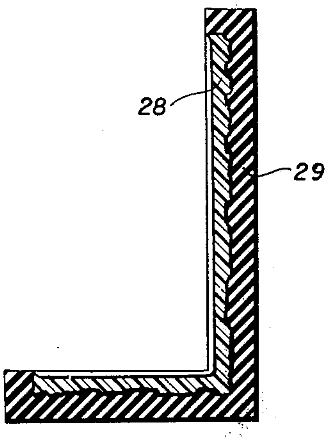
FIG. 10 is a sectional view of the mold of FIG. 9 taken on the line X—X of FIG. 9.
Figure 11:
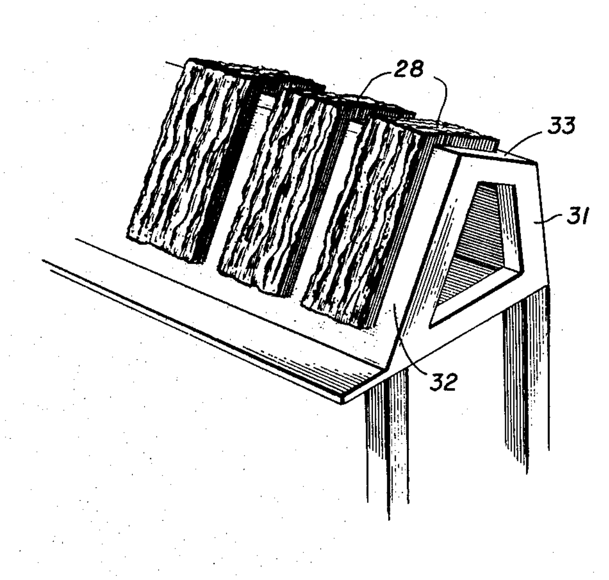
FIG. 11 shows the manner in which the brick formed in accordance with the practice shown in FIGS. 9 and 10 is cured.

FIGS. 9, 10, and 11 show the making of a corner brick. In this case, the brick 28 is L-shaped and is formed of the same plastic as the brick 10. The mold 29 is also L-shaped in cross-section. Here again, because the mold is formed of an elastomer plastic, it is possible to deform the mold to remove a brick, which, otherwise, could not be drawn. After the brick has been removed, it is placed on a special stand 31 with its long leg lying on a steeply inclined surface 32 and its short leg on an only slightly inclined surface 33.

In both cases, the simulated brick is formed of a resin mixed with sufficient limestone filler to give a dull, clay-like appearance and also mixed with a color. In the case of a simulated brick which is to have an antique appearance, while the brick is on the stand 21 (in the case of the brick 10) and the stand 31 (in the case of the brick 28), it is subjected to burning with a blow torch or the like, which acts to give a slightly black or tinged appearance. This antique appearance may also be accomplished by using a black spray paint and just passing it lightly so that certain points of the brick are high-lighted by the paint. In the case of the mastic 20, a suitable formula for forming about 80 gallons of mastic is as follows:

- 22 gallons of DuPont "Elvacet 1440", which is a polyvinyl acetate copolymer emulsion
- 4 gallons of a wetting agent, such as ethylene glycol
- 2 gallons of water
- 550 lbs. of powdered limestone
- 200 lbs. of an "O" sand; this is a very fine, dry sand
- 2 lbs. of PVP (polyvinyl paralydyne)
- 1 lb. of gray color The plastic used in the brick is a polyester manufactured by Reichold Chemical, Inc. under the trade name of "POLYLITE" and it is used with a catalyst known as "MEK 60" which is methyl ethyl ketone. A plasticizer of dibutyl phthylate is used. The coloring material is selected from those known as "earth" colors; such a coloring material is iron oxide red. In order to fireproof the brick, antimony oxide may be used. In the case of the mold, the elastomer is polyvinyl chloride as manufactured by B. F. Goodrich, used along with a plasticizer, a stabilizer, and some fillers in the usual manner.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A method for forming a simulated brick having a configured undercut surface comprising the steps of:

a. forming an open-cavity mold of polyvinyl chloride, b. filling each cavity with a polyester plastic in a liquid condition, c. passing a rigid, sharp blade over the mold to compress it substantially and carry away sufficient plastic so that less plastic than normal capacity of each cavity remains behind, and d. permitting the mold to return to its normal condition, so that the general level of the plastic in each cavity is below the upper edge of the cavity, but the plastic around the edges of each cavity is held by surface tension at the said upper edge to form a flange curving from a sharp edge to the said general level of the plastic, at least partially curing said polyester plastic to form a simulated brick, removing said brick from said mold, the rubber-like nature of the mold material permitting the simulated brick to be withdrawn from the mold despite the configured surface, e. depositing a layer of mastic against a side of said simulated brick opposite said configured undercut surface thereof and in a cavity formed by said side and said flange and leveling said mastic.

* * * * *